(12) United States Patent
Adachi et al.

(10) Patent No.: US 7,698,129 B2
(45) Date of Patent: Apr. 13, 2010

(54) INFORMATION PROCESSOR, CUSTOMER NEED-ANALYZING METHOD AND PROGRAM

(75) Inventors: Tetsuro Adachi, Fujisawa (JP);
Tsutomu Tsuyama, Yokohama (JP);
Ako Shose, Tokyo (JP)

(73) Assignee: Hitachi, Ltd. (JP)

( * ) Notice: Subject to any disclaimer, the term of this patent is extended or adjusted under 35 U.S.C. 154(b) by 650 days.

(21) Appl. No.: 11/675,748

(22) Filed: Feb. 16, 2007

(65) Prior Publication Data

US 2007/0198249 A1   Aug. 23, 2007

(30) Foreign Application Priority Data

Feb. 23, 2006   (JP)   ............................. 2006-047341

(51) Int. Cl.
*G06F 17/27*   (2006.01)
(52) U.S. Cl. ...................... 704/9; 704/1; 704/10; 707/2; 707/3; 707/4; 707/5; 707/6; 715/254; 715/255; 715/256
(58) Field of Classification Search ...................... 704/1, 704/9, 10; 707/2–6; 715/254–256
See application file for complete search history.

(56) References Cited

U.S. PATENT DOCUMENTS

| 4,887,212 A | * | 12/1989 | Zamora et al. | .................. 704/8 |
| 5,020,019 A | * | 5/1991 | Ogawa | ........................... 707/5 |
| 6,366,759 B1 | * | 4/2002 | Burstein et al. | ............. 434/353 |

(Continued)

FOREIGN PATENT DOCUMENTS

JP   2004-021445   1/2004

(Continued)

OTHER PUBLICATIONS

Liu et al., Mining and summarizing customer reviews, International Conference on Knowledge Discover and Data Mining, 2004, pp. 168-177.*

(Continued)

*Primary Examiner*—David R Hudspeth
*Assistant Examiner*—Lamont M Spooner
(74) *Attorney, Agent, or Firm*—Antonelli, Terry, Stout & Kraus, LLP.

(57) ABSTRACT

The present invention enables analysis of customer needs with a high level of precision, not by indicating whether the customer opinions are positive or negative, but by quantitatively indicating their levels of importance. An information processor storing customer opinion information containing document data expressing opinions of customers in natural language, includes: a morphological analysis unit which parses document data into individual words, correlates each individual word to a grammatical part of speech, and outputs resultant data; a syntactic analysis unit which uses the data outputted from the morphological analysis unit to analyze content of the document; a clustering unit which uses the processing results from the syntactic analysis unit to categorize and output the customer opinion information according to predetermined customer needs; an evaluative word definition unit which receives, from a user, a setting of a keyword for evaluating the customer needs and an evaluation value for the keyword; and a tally processing unit which calculates a score indicating level of importance of the customer need, by using the customer opinion information categorized by the customer needs, along with the keyword and evaluation value set for the keyword.

8 Claims, 15 Drawing Sheets

U.S. PATENT DOCUMENTS

| | | | |
|---|---|---|---|
| 6,539,372 B1* | 3/2003 | Casey et al. | 707/3 |
| 6,553,347 B1* | 4/2003 | Tavor et al. | 705/14.25 |
| 7,120,865 B1* | 10/2006 | Horvitz et al. | 715/210 |
| 7,269,544 B2* | 9/2007 | Simske | 704/4 |
| 7,272,617 B1* | 9/2007 | Bayer et al. | 707/104.1 |
| 7,363,214 B2* | 4/2008 | Musgrove et al. | 704/9 |
| 7,437,382 B2* | 10/2008 | Zhang et al. | 707/102 |
| 7,454,716 B2* | 11/2008 | Venolia | 715/853 |
| 7,533,090 B2* | 5/2009 | Agarwal et al. | 707/5 |
| 2001/0047290 A1* | 11/2001 | Petras et al. | 705/10 |
| 2007/0073751 A1* | 3/2007 | Morris et al. | 707/101 |

FOREIGN PATENT DOCUMENTS

| | | |
|---|---|---|
| JP | 2005-115468 | 4/2005 |

OTHER PUBLICATIONS

Wilson et al., Recognizing contextual polarity in phrase-level sentiment analysis, Human Language technology conference, 2005, pp. 345-354.*

Popescu et al., Extracting product features and opinions from reviews, 2005, Proceedings of HLT/EMNLP, pp. 9-28.*

Nasukawa et al, Sentiment analysis: capturing favorability using natural language processing, International Conference on Knowledge Capture, 2003, pp. 70-77.*

Dini et al., Opinion classification through information extraction, 2002, Citeseer, pp. 1-11.*

* cited by examiner

FIG. 2

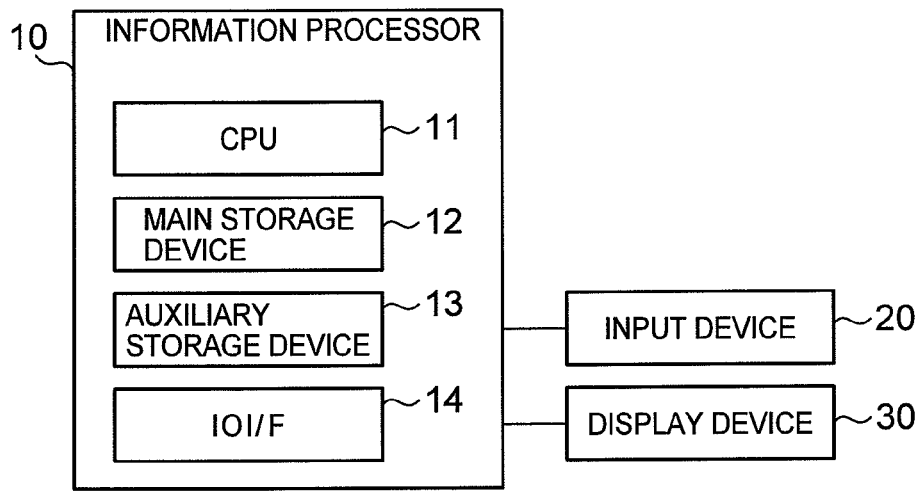

FIG. 3

VOC DATA 201a

SUBJECT MODEL : ELEVATOR A

| VOC-ID | REGION | TARGET BUILDING TYPE | RESPONSES |
|---|---|---|---|
| 00001 | 012 | APARTMENT COMPLEX | THE AVAILABLE COLORS OF THE DOORS ARE NOT GOOD, MORE OPTIONS... |
| 00002 | 003 | APARTMENT COMPLEX | NO BIG DIFFERENCE IN DESIGN AND COMFORT AMONG THE 5 COMPANIES |
| 00003 | 003 | MULTI-PURPOSE BUILDING | DESIGN MUST BE IMPROVED MORE THAN FUNCTIONALITY |
| 00004 | 003 | MULTI-PURPOSE BUILDING | SMALL GAPS SHOULD BE MADE STANDARD |
| 00005 | 040 | DEPARTMENT STORE | PUT IN ELEVATORS THAT ARE FUN TO USE |
| 00006 | 002 | MULTI-PURPOSE BUILDING | IMPROVE COST PERFORMANCE FOR SPEC CHANGES...... |
| ⋮ | ⋮ | ⋮ | ⋮ |

FIG. 4

VOC Fail Name : QUESTIONNAIRE DATA
 PRODUCT : ELEVATOR MODEL A

2300

WAITING TIME

SPEED

COMFORT  402

APPEARANCE

| VOC-ID | RESPONSES | SCORE |
|---|---|---|
| 00001 | THE AVAILABLE COLORS OF THE DOORS ARE NOT GOOD, MORE OPTIONS... | NULL |
| 00002 | NO BIG DIFFERENCE IN DESIGN AND COMFORT AMONG THE 5 COMPANIES | NULL |
| 00003 | DESIGN MUST BE IMPROVED MORE THAN FUNCTIONALITY | NULL |

| EVALUATED DATABASE | MODEL (PRODUCT NAME) | EVALUATIVE WORD | LEVEL OF IMPORTANCE |
|---|---|---|---|
| QUESTIONNAIRE | ELEVATOR A | WANT | 3 |
| QUESTIONNAIRE | ELEVATOR A | DIFFICULT | 2 |
| QUESTIONNAIRE | ELEVATOR A | HAPPY | 1 |
| QUESTIONNAIRE | ELEVATOR A | GOOD | 1 |
| QUESTIONNAIRE | ELEVATOR A | MUST | 1 |
| QUESTIONNAIRE | ELEVATOR A | NOT | 1 |
| CALL CENTER | ELEVATOR A | ... | ... |
| ... | ... | ... | ... |

| KEYWORD | EXTRACTED WORD | GRAMMATICAL PART OF SPEECH |
|---|---|---|
| ☑ | WANT | ADJECTIVE |
| ☑ | DIFFICULT | ADJECTIVE |
| ☑ | HAPPY | ADJECTIVE |
| ☑ | ... | ... |
| ☐ | DIAGRAM | NOUN |
| ☐ | A LITTLE MORE | ADVERB |
| ☑ | TOO MUCH | ADVERB |
| ☑ | MUST | ADVERB |

VOC Fail Name : QUESTIONNAIRE DATA
MODEL : ELEVATOR A

RETRIEVE(O)　DISPLAY(F)　HELP(H)

| ADJECTIVE | VERB | ADVERB | NOUN | ... |
|---|---|---|---|---|

| VOC EVALUATIVE WORD | LEVEL OF IMPORTANCE |
|---|---|
| WANT | 3 |
| DIFFICULT | 2 |
| HAPPY | 1 |
| GOOD | 1 |

VOC Fail Name : QUESTIONNAIRE DATA
PRODUCT : ELEVATOR MODEL A

RETRIEVE(O)  DISPLAY(F)  HELP(H)

FIG. 11

RETRIEVE(O)   DISPLAY(F)   HELP(H)

VOC Fail Name : QUESTIONNAIRE DATA
SUBJECT PRODUCT : ELEVATOR A MODEL

| APPEARANCE | COMFORT | SPEED | WAITING TIME | ... |

| VOC-ID | RESPONSES |
|---|---|
| 00001 | THE AVAILABLE COLORS OF THE DOORS ARE NOT GOOD, MORE OPTIONS... |
| 00002 | NO BIG DIFFERENCE IN DESIGN AND COMFORT AMONG THE 5 COMPANIES |
| 00003 | DESIGN MUST BE IMPROVED MORE THAN FUNCTIONALITY |

FIG. 12

| VOC Fail Name : QUESTIONNAIRE DATA |||
| PRODUCT : ELEVATOR MODEL A |||

WAITING TIME

SPEED

COMFORT

APPEARANCE

| VOC-ID (231) | RESPONSES (232) | SCORE (233) |
|---|---|---|
| 00001 | THE AVAILABLE COLORS OF THE DOORS ARE NOT GOOD, MORE OPTIONS... | 6 |
| 00002 | NO BIG DIFFERENCE IN DESIGN AND COMFORT AMONG THE 5 COMPANIES | 1 |
| 00003 | DESIGN MUST BE IMPROVED MORE THAN FUNCTIONALITY | 3 |
| ⋮ | ⋮ | |

VOC Fail Name : QUESTIONNAIRE DATA
SUBJECT PRODUCT : ELEVATOR A MODEL

| NEED CATEGORY | QUANTITY OF RESPONSES | SCORE (SUM) | SCORE (AVERAGE) | SCORE (DISTRIBUTION) |
|---|---|---|---|---|
| APPEARANCE | 3 | 10 | 3.3 | 4.2 |
| COMFORT | -------- | -------- | -------- | -------- |
| SPEED | -------- | -------- | -------- | -------- |
| WAITING TIME | -------- | -------- | -------- | -------- |

FIG. 14

VOC Fail Name : QUESTIONNAIRE DATA
PRODUCT : ELEVATOR MODEL A

| VOC-ID | REGION | TARGET BUILDING TYPE | NEEDS CATEGORY | LEVEL OF IMPORTANCE |
|---|---|---|---|---|
| 00001 | 012 | APARTMENT COMPLEX | APPEARANCE | 6 |
| 00002 | 003 | APARTMENT COMPLEX | APPEARANCE | 1 |
| 00003 | 003 | MULTI-PURPOSE BUILDING | APPEARANCE | 3 |
| 00004 | 003 | MULTI-PURPOSE BUILDING | DOOR GAP | ---------- |
| 00005 | 040 | DEPARTMENT STORE | FUNCTIONALITY | ---------- |
| 00006 | 002 | MULTI-PURPOSE BUILDING | COST | ---------- |
| ⋮ | ⋮ | ⋮ | ⋮ | ⋮ |

INFORMATION PROCESSOR, CUSTOMER NEED-ANALYZING METHOD AND PROGRAM

BACKGROUND OF THE INVENTION

The present invention relates to an information processing technique, and more particularly to a text mining technique which divides document data into individual words and the like, and analyzes frequency of appearance, mutual relationship, and the like, of the individual words.

In order to develop a product that is appreciated by customers, it is necessary to stand in the position of the customer who actually purchases and uses the product, in other words, to develop products through an "in-market" orientation, instead of planning and developing from the conventional product output perspective, so as to differentiate the product from competitors' products and increase product attractiveness. For the purpose of resolving this problem, many companies conduct marketing activities by performing market surveys to collect customer opinions and analyzing the customer opinions thus collected in order to comprehend trends in the market and customer needs, or to define target customers. Companies also use product and service complaints which are sent to their call centers, along with customer opinions that are written on the company web site discussion boards, as important information for comprehending customer needs.

The above-described marketing activities and customer opinions that are collected at call centers (VOC: Voice of Customer) involve much textual data in the form of natural language text, rather than numerical values. For example, the entries in the free comment sections of questionnaire surveys, and the complaints received at call centers and the like, are written in textual format. Because of this, in order to grasp customer needs and market trends, it is necessary to accurately analyze data in text format (text data). As a method of analyzing voluminous electronic text data, a method is known that is referred to as text mining to which data mining techniques for analyzing numerical data are applied.

For example, Japanese Patent Laid-Open Publication No. 2004-21445 (hereinafter, referred to as Patent Document 1) discloses a text mining system for objectively presenting voluminous text data. The text mining system disclosed in Patent Document 1 adopts a quantification technique that counts frequency of appearance of specific individual words contained in text that is being searched, and a quantification technique that counts the number of documents containing words similar to these specific individual words.

Japanese Patent Laid-Open Publication No. 2005-115468 (hereinafter, referred to as Patent Document 2) discloses a technique that creates a conceptual dictionary for each product being analyzed, then cross-compares text being evaluated against a database containing predefined patterns of words indicating positive and negative evaluations, and then calculates the levels of satisfaction and dissatisfaction expressed in the text.

SUMMARY OF THE INVENTION

However, the techniques disclosed in Patent Documents 1 and 2 described above have the following problems. Namely, the system disclosed in Patent Document 1 evaluates each individual word and document only in terms of frequency of appearance, which creates the possibility that identical treatment is given to customer opinions that should be given more importance and those which should not. For example, in a case where a specific individual word appears at a greater frequency for a specific customer need, it is possible to assume that this opinion is of particular interest to the customers. However, that particular individual word itself does not necessarily indicate an important customer need. With only the specific individual words themselves, it is impossible to ascertain whether the responding customer is pleased, dissatisfied, or simply stating a fact; it is impossible to judge whether the opinion should really be treated with importance. In other words, with the method disclosed in Patent Document 1, there is a possibility that customer needs will not be comprehended accurately. Therefore, this manner of product development, which depends only on high-frequency customer opinions, can lead to products with unimpressive features, not ones that are actually attractive to customers.

According to the technique disclosed in Patent Document 2, detailed analyses of specific customer opinions are performed by extracting information from a certain individual word as to whether the opinion is positive or negative. In product planning, there may be a case where certain customer opinions are given importance. However, there are also cases where the certain customer opinions are anomalous, and there is a risk that the anomalous opinions will be followed blindly during product planning. The technique disclosed in Patent Document 2 analyzes each individual opinion, thereby enabling determination of whether each individual customer opinion is positive or negative. However, it is difficult to obtain a generalized determination based on customer opinions of various types. For example, consider a case where there are customers who express satisfaction and customers who express dissatisfaction with respect to a specific individual word. There is a risk that evaluations with respect to that individual word will cancel each out, creating a problem in that an evaluation value for that individual word cannot be calculated.

The present invention has been made in light of the aforementioned circumstances, and it is therefore an object of this invention to analyze customer needs with a high level of precision, not by indicating whether the customer opinions are positive or negative, but by quantitatively indicating the levels of importance of the customer opinions.

In order to attain the object, an embodiment of the present invention is applied to an information processor, which performs processing of analyzing customer needs by using customer opinion information, including a storage unit which stores a database in which a plurality of customer opinion information is registered. In this configuration, the customer opinion information including text-format document data of opinions from customers expressed in natural language concerning one of a product and a service to be analyzed.

Further, the information processor includes: a morphological analysis unit which parses into individual words the document data contained in the customer opinion information registered in the database, correlates each parsed individual word to a grammatical part of speech, and outputs data correlating the individual words to their grammatical parts of speech; a syntactic analysis unit which uses the data outputted from the morphological analysis unit to analyze content of the text according to syntactic relationships among the individual words; a clustering unit which uses the processing results from the syntactic analysis unit to categorize the plurality of customer opinion information by predetermined customer needs, and outputs the customer opinion information categorized by the customer needs; an evaluative word definition unit which receives, from a user, a setting of a keyword for evaluating a customer need, and further receives an input of an evaluation value showing an evaluative level of the keyword and correlating the evaluation value of the keyword; and an evaluation unit which obtains the customer opinion information categorized by the customer needs, extracts the keywords for each customer opinion information from the document data contained in the customer opinion information, and calculates a score showing a level of importance of the customer need in which the evaluation values correlated to the extracted keyword are tallied, in which the evaluative word definition unit obtains from the morphological analysis unit the data correlating the individual words to their grammatical parts of speech, sorts the obtained data by their grammatical parts of speech, and presents to the user the individual words sorted by their grammatical parts of speech, and receives selections of keywords from among the individual words that are presented, according to a request from the user.

According to the present invention, a user is made to set a keyword to analyze, and an evaluation value indicating an evaluation level for that keyword; and the keyword and the evaluation level are used to obtain the levels of importance of customer opinion information according to each customer need. In other words, in the present invention, the keyword and the evaluation value are set according to the type of customer opinion information that is being analyzed, so that the customer needs can be analyzed accurately. As a result, many customer opinions can be reflected in products and services, and it is possible to increase market recognition of products and services.

BRIEF DESCRIPTION OF THE DRAWINGS

In the accompanying drawings:

FIG. 2 is a hardware configuration diagram of an information processor according to an embodiment of the present invention;

FIG. 3 is a diagram schematically showing an example of a data structure of VOC data used in the embodiment of the present invention;

FIG. 4 is a diagram showing an example of a VOC table used by a customer need-analysis system according to the embodiment of the present invention to calculate scores for levels of importance of customer needs;

FIG. 5 is a diagram schematically showing a data structure of an evaluative word table according to the embodiment of the present invention;

FIG. 9 is a diagram showing an example of a screen for setting evaluative words in the customer need-analysis system according to the embodiment of the present invention;

FIG. 10 is diagram showing another example of a screen for setting evaluative words in the customer need-analysis system according to the embodiment of the present invention;

FIG. 11 is a diagram showing an example of a screen with VOC data categorized by each type of customer need, which is displayed by the customer need-analysis system according to the embodiment of the present invention;

FIG. 12 is a diagram exemplifying a VOC table used by the customer need-analysis system according to the embodiment of the present invention to calculate scores for the levels of importance of the customer needs;

FIG. 13 is a diagram schematically showing a data structure of a tallying table according to the embodiment of the present invention;

FIG. 14 is a diagram schematically showing a data structure of a tallying table according to the present invention;

DESCRIPTION OF THE PREFERRED EMBODIMENTS

Hereinafter, explanation is made of an embodiment of the present invention with reference to the drawings.

Figure 1:
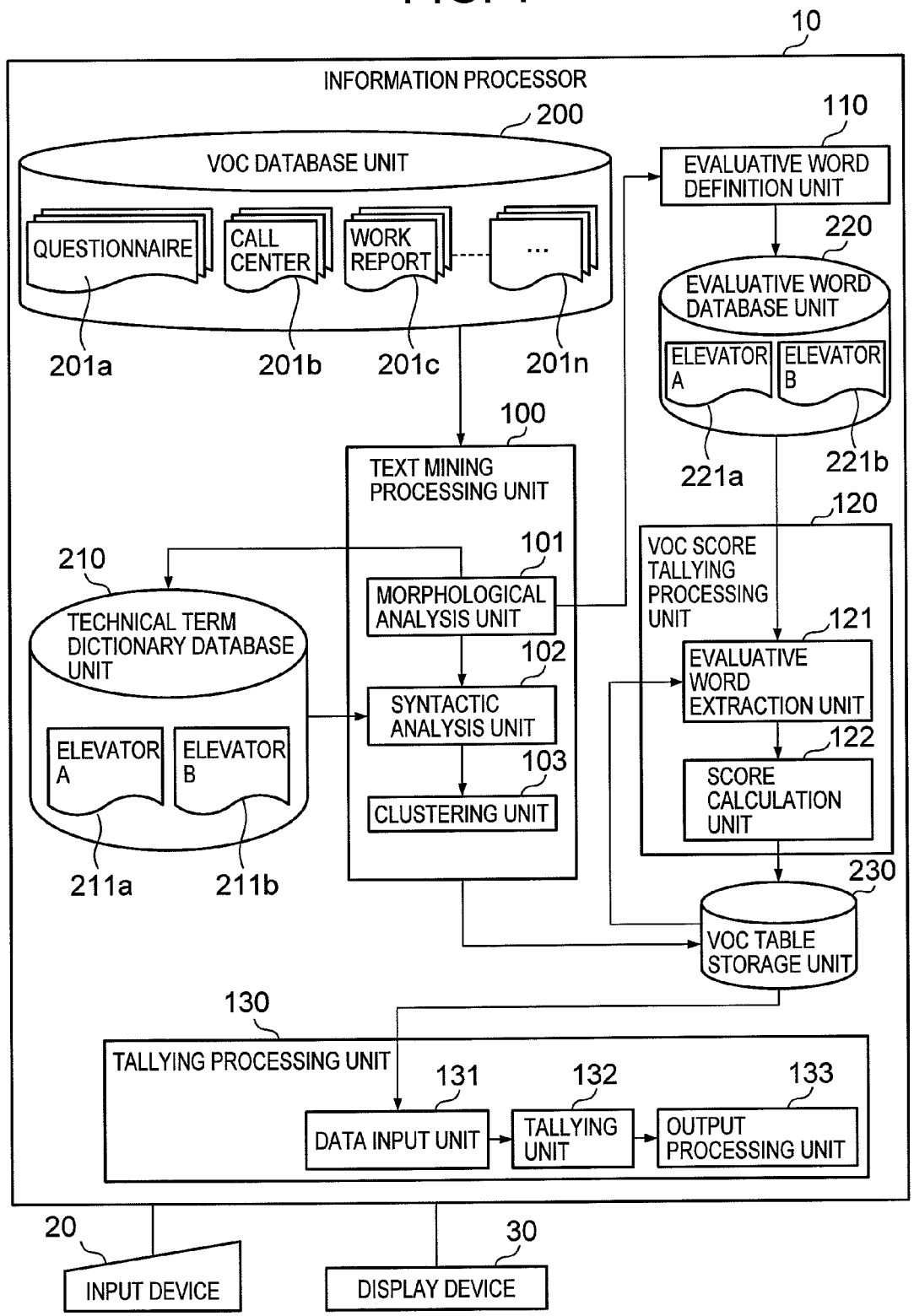
FIG. 1 is a functional block diagram of a customer need-analysis system according to an embodiment of the present invention.

First, FIG. 1 is used to explain an overall configuration of an embodiment of the present invention. FIG. 1 is a functional block diagram of a customer need-analysis system according to an embodiment of the present invention.

As shown in the diagram, the customer need-analysis system includes: an information processor 10 that uses text data showing a customer opinion (VOC: Voice of Customer) written in natural language, to perform processing to analyze the customer's needs; an input device 20 such as a keyboard or a mouse; and a display device 30 made of a liquid crystal display or the like. The customer need-analysis system receives, through the input device 20 and an external device (not shown), an input of data showing the customer opinion (VOC) in the form of questionnaire results, claims, and the like brought to the call center. The customer need-analysis system uses the data showing the received customer opinions, performs analysis of customer needs, and displays the analysis results on the display device 30.

Specifically, the information processor 10 includes: a text mining processing unit 100; an evaluative word definition unit 110; a VOC score tally processing unit 120; a tally processing unit 130; a VOC database unit 200; a technical term dictionary database unit 210; an evaluative word database unit 220; and a VOC table storage unit 230.

The VOC database unit 200 stores data showing customer opinions (VOCs) (hereinafter, sometimes referred to as simply "VOC data") including end user questionnaires, opinions collected at call centers, and various reports. In the example shown in the diagram, the VOC database unit 200 stores, as the customer opinions, such things as the following: VOC data 201a, which is the questionnaire results that are tallied and shrunk (turned into files); VOC data 201b, which are the customer opinions received at call centers that are turned into files; VOC data 201c, which are work reports that are tallied and turned into files. Below, the filename of the VOC data

201*a* is referred to as the "questionnaire data". The filename of the VOC data 201*b* is referred to as the "call centers". The filename of the VOC data 201*c* is referred to as the "work reports".

Note that "work reports" are given here as an example of the VOC data 201, because daily work reports and the like sometimes include such things as: opinions on how a company can get an edge over its competitors' products and services; the company's own problems (weaknesses); or new product ideas proposed at meetings. Therefore, by analyzing a collection of work reports, it is possible to obtain hints about product specifications and ideas that lead to an edge on the competition.

FIG. 3 shows a data configuration of the VOC data 201 stored in the VOC database unit 200.

FIG. 3 is a diagram schematically showing an example of a data structure of the VOC data used in an embodiment of the present invention. Note that in FIG. 3, the VOC data is data which has been obtained by tallying questionnaire results from users concerning a product (an elevator A in this case).

As shown in the diagram, the VOC data 201*a* is a database in which questionnaire results concerning the elevator A are collected and registered. Specifically, the VOC data 201*a* is configured such that a single record is provided with: a field 301 for registering "VOC-ID" that identifies each tallied customer opinion; fields 302, 303 for registering "attribute information" about each customer opinion; and a filed 304 for registering "questionnaire responses about the elevator A" (sometimes simply referred to as "responses"). Note that in the example shown in the diagram, the customer opinion attribute information includes the field 302 for registering a "region number" for identifying the region where the elevator A is located, and the field 303 for registering a type of a building where the elevator A is located (i.e., data showing whether the elevator A is being used in an apartment complex, or in a multi-purpose building, etc.).

Note that the customer attribute information shown in the diagram is merely an exemplary illustration. In this embodiment, the customer opinion attribute information refers to any data for characterizing the customer who has responded to the questionnaire. For example, the attribute information may utilize data referring to the customer's profile, such as his or her gender, physical characteristics, tastes, profession, and the like. Also, the attribute information may utilize data indicating the type of work report, or the characteristics of the work, such as the importance/urgency of the work. The responder/writer is asked to input this attribute information by the analyst (user) who plans in advance how to perform the analyses, and the attribute information cannot be added after collecting the customer opinions. The categories of attribute information to be collected may vary depending on the new product to be developed, so not all of the various attribute information is the same for all the VOC data 201 stored in the VOC database 200. Therefore, it is important to set the right categories in light of the detailed analyses of the evaluation results, which are discussed below. As to the method of notating the attribute information, it is desirable to use 0's and 1's or other such encoding, in order to perform the analyses efficiently.

Explanation now continues, again referring to FIG. 1. The text mining processing unit 100 uses an existing text mining technique to perform data analysis processing by using the VOC data 201 stored in the VOC database unit 200. Specifically, the text mining processing unit 100 has a morphological analysis unit 101, a syntactic analysis unit 102, and a clustering unit 103. The morphological analysis unit 101 performs parsing processing (word parsing processing) on the text-format document data, and processing to correlate the parsed individual words to grammatical parts of speech. The syntactic analysis unit 102 performs semantic analysis according to the grammatical relations of the individual words. The clustering unit 103 categorizes the records registered in the VOC data 201 that is being analyzed, into groups of texts having similar content. Specifically, the clustering unit 103 creates a VOC table in which the VOC data 201 are categorized by individual customer-need categories (appearance, comfort, etc.) which are set in advance by the analyst (user), and then stores the VOC table thus created into the VOC table storage unit 230. FIG. 4 shows an example of a data structure for the VOC table stored in the VOC table storage unit 230.

FIG. 4 is a diagram exemplifying a VOC table, which the customer need-analysis system, according to the embodiment of the present invention, uses to calculate scores corresponding to levels of importance of customer needs. Note that the diagram shows a VOC table 2300 used for the processing of analyzing responses to the questionnaire concerning the elevator A.

As shown in the diagram, the VOC table 2300 is divided into various predetermined customer need-categories ("appearance", "comfort", "speed", "waiting time", etc.), and entries 231 to 233 are set for each customer need-category. The entry 231 has the "VOC-ID". The entry 232 has the "Responses" specified by each "VOC-ID". The entry 233 has values of scores evaluating the "Responses" registered in entry 232. Note that at the stage where the clustering unit 103 creates the VOC data 2300, the scores that evaluate the "Responses" have not been calculated yet, so entry 233 has the value "NULL" (or an empty space).

The explanation now continues, again referring to FIG. 1. The technical term dictionary database unit 210 stores technical term dictionary data 211, where product-specific expressions and words are registered for each product. In FIG. 1, technical term dictionary data 211*a* for the elevator A and technical term dictionary data 211*b* for an elevator B are stored therein. The technical term dictionary database unit 210 is used when the text mining processing unit 100 performs processing to analyze the VOC data. Specifically, the text mining processing unit 100 references the technical term dictionary data 211 stored in the technical term dictionary database unit 210, in addition to its own dictionary data, and performs the data processing in light of the product-specific expressions and words of the product that is being analyzed. Moreover, in response to a request from the analyst, the text mining processing unit 100 registers the part-of-speech information of the words that were added into the word list, which is the morphological analysis result, into the technical term dictionary database unit 210.

The evaluative word definition unit 110 displays an evaluative word setting screen (FIGS. 9 and 10) on the display device 30, and performs processing to have the analyst define evaluative words to be used as keywords for evaluating the customer needs, and also numerical values indicating the levels of importance of those words. More specifically, the evaluative word definition unit 110 guides the analyst through the evaluative word setting screens (FIGS. 9 and 10), and has the analyst input the evaluative words for the customer needs, along with their levels of importance, via the input device 20. The evaluative word definition unit 110 receives the evaluative words for a customer need, along with the levels of importance thereof, which were inputted by the analyst (user), and stores the received data into the evaluative word database unit 220.

The evaluative word database unit 220 stores the data indicating the received customer-need evaluative words and their levels of importance. Note that, in the following explanation, an example situation is used in which the data showing the customer-need evaluative words and their levels of importance is stored in the evaluative word database unit 220 as data in a table format (hereinafter, "evaluative word table 221"). The evaluative word table 221 is configured as a database for each subject being evaluated (e.g., for each product). Here, a data structure of the evaluative word table 221 is shown in FIG. 5.

FIG. 5 is a diagram schematically showing a data structure of the evaluative word table stored in the evaluative word database unit 220 of this embodiment. Note that FIG. 5 exemplifies an evaluative word table 221a for the elevator A.

As shown in the diagram, the evaluative word table 221a has: an entry 2211 registering a filename of the VOC data 221 for the subject being evaluated; an entry 2212 registering a model name of the product which the VOC data 221 refers to; an entry 2213 registering the evaluative words; and an entry 2214 registering the levels of importance. Note that what is meant by the "level of importance" of each evaluative word for the various customer needs registered in the entry 2214 is a value that is inputted after statistically determining market trends and patterns in the customers' historic tastes. A larger value shows a higher level of importance for evaluative words, indicating a greater urgency to realize what the customer needs. Here, a three-level range of 1, 2 and 3 has been given for the evaluative words for the customers' needs, but to define the levels of importance is not limited thereto.

The explanation now continues, again referring to FIG. 1. The VOC score tally processing unit 120 performs processing (score calculation processing) to tally points for the VOC data 201 that is being evaluated (e.g., questionnaire information 201a). Specifically, the VOC score tally processing unit 120 has an evaluative word extraction unit 121 and a score calculation unit 122. The evaluative word extraction unit 121 references the evaluative word table 221 of the evaluative word database unit 220, and extracts the evaluative words from the "Responses" registered in the entry 232 of the VOC table 2300 (FIG. 4) stored n the VOC table storage unit 230. The score calculation unit 122 tallies the levels of importance of the extracted evaluative words, for each of the "Responses" specified in each "VOC-ID". The score calculated by the VOC score tally processing unit 120 is registered into the entry 233 in the VOC table 2300 (FIG. 4). Note that processing by the VOC score tally processing unit 120 is explained in detail below.

The tally processing unit 130 performs various statistical processing on the data stored in the voice table 2300, and presents the results to the analyst. For example, the tally processing unit 130 displays a screen showing the analysis results on the display device 30. More specifically, the tally processing unit 130 includes: a data input unit 131, which receives an instruction from the analyst and then retrieves the VOC table 2300 for the subject being analyzed from the VOC table storage unit 230; a tallying unit 132, which uses the data stored in the VOC table storage unit 230 to perform statistical processing; and an output processing unit 133, which generates image data displaying the processing results from the tallying unit 132, and displays the image data obtained as the result of the processing onto the display device 30.

Next, FIG. 2 shows a hardware configuration of the information processor 10 according to this embodiment.

FIG. 2 is a hardware structural diagram of an information processor 10 according to the embodiment of the present invention. As shown in the diagram, the information processor 10 has: a CPU 11 which executes various data processing; a main storage device 12 such as a random access memory (RAM) or the like which temporarily stores data; an auxiliary storage device 13 such as a hard disk device or the like for storing a program and various items of data; and an IOI/F unit 14 which controls transmission and reception of data to and from an external device.

The auxiliary storage device 13 stores a program for realizing the functions of each of the aforementioned units (the text mining processing unit 100, the evaluative word definition unit 110, the VOC score tally processing unit 120, and the tally processing unit 130).

The functions of each unit shown in FIG. 1 (the text mining processing unit 100, the evaluative word definition unit 110, the VOC score tally processing unit 120, and the tally processing unit 130) are realized by the CPU 11 which loads the program stored in the auxiliary storage device 13 into the main storage device 12 and executes the program.

The VOC database unit 200, the technical term dictionary database unit 210, the evaluative word database unit 220, and the VOC table storage unit 230 are stored in predetermined regions of the main storage device 12 and the auxiliary storage device 13.

Figure 6:
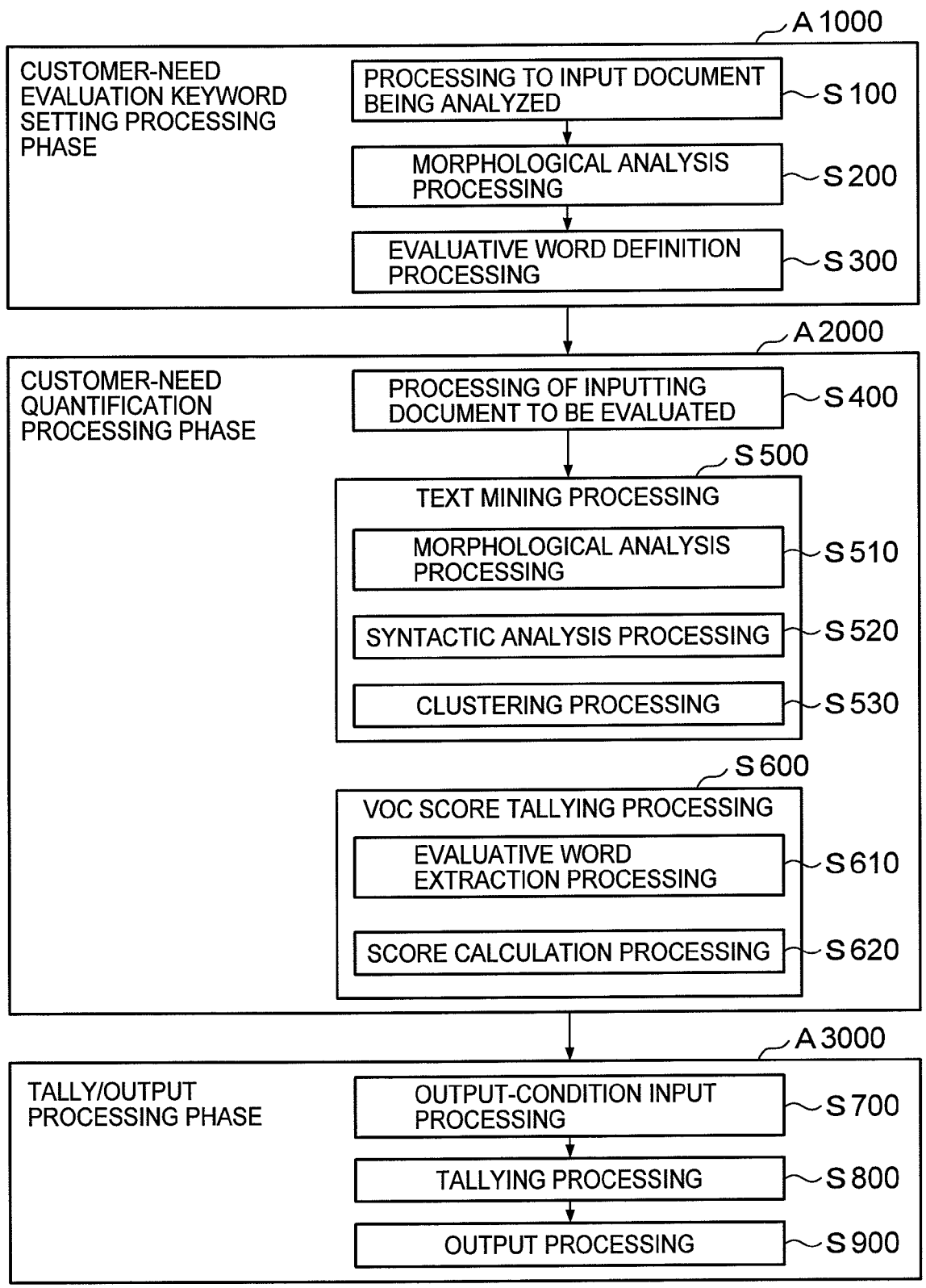
FIG. 6 is a diagram for explaining flow of processing performed by the customer need-analysis system according to the embodiment of the present invention.
Figure 7:
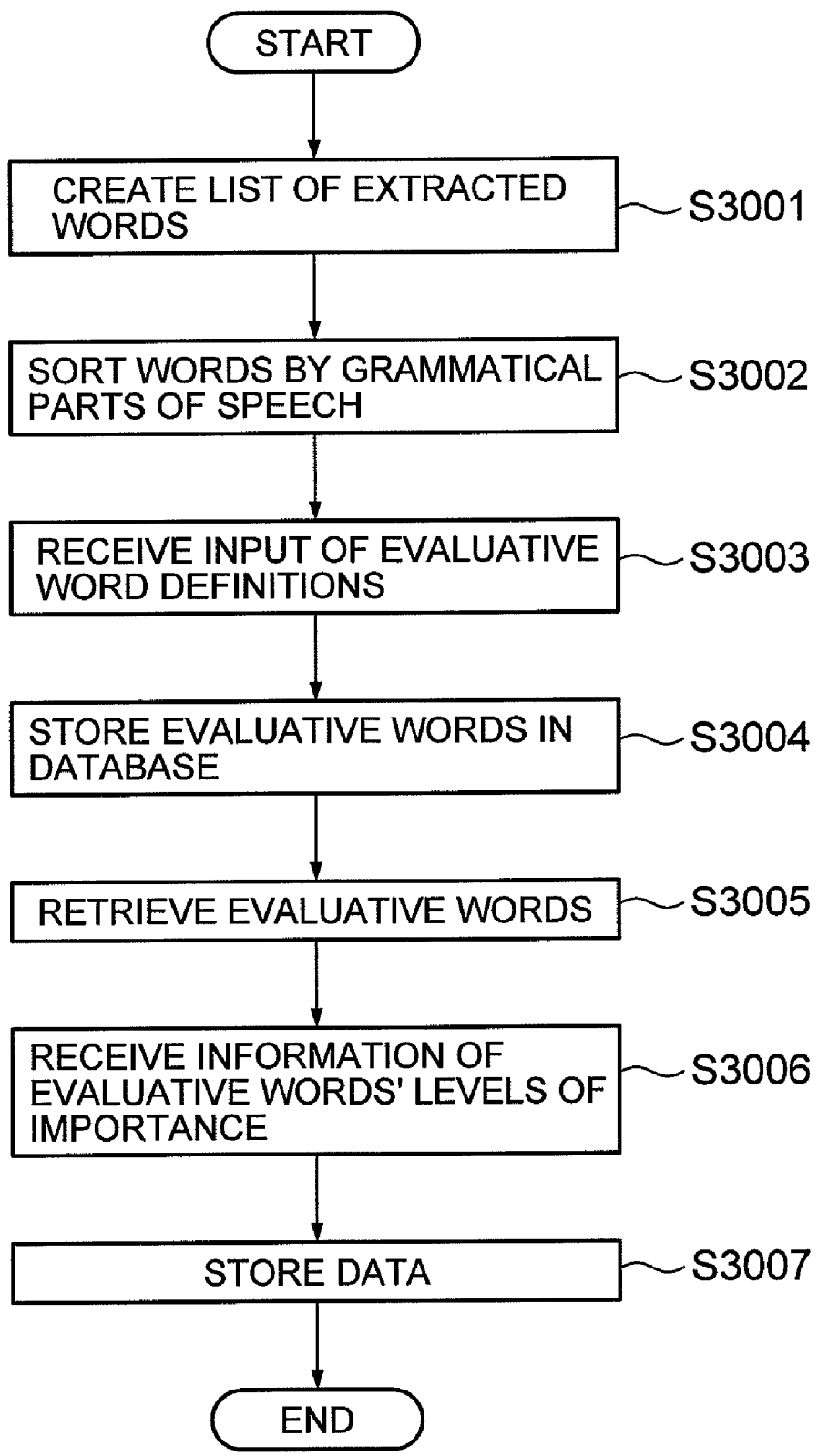
FIG. 7 is a diagram for explaining flow of evaluative word definition processing performed by the customer need-analysis system according the embodiment of the present invention.

Next, the processes performed by the customer need-analysis system in this embodiment are explained using FIGS. 6 and 7.

FIG. 6 is a diagram for explaining the flow of processing performed by the customer need-analysis system according to this embodiment. FIG. 7 is a diagram for explaining the flow of processing to define the evaluative words, which is performed by the customer need-analysis system of this embodiment.

As shown in the diagram, the processes performed by the customer need-analysis system of this embodiment are categorized into three processing phases. Namely, the processes performed by the customer need-analysis system are categorized into: a customer need evaluation keyword setting processing phase A1000; a customer need-quantification processing phase A2000; and a tallying/output processing phase A3000.

The customer need-analysis system first determines which evaluative words to use for analysis of the VOC data 201 being analyzed, along with levels of importance (evaluation values) of those evaluative words, by performing the customer need evaluation keyword setting processing phase A1000. Next, by performing the customer need-quantification processing phase A2000, the customer need-analysis system quantifies the VOC data 201 that is being analyzed by using the "evaluative words" and "levels of importance" that were set in the customer need evaluation keyword setting processing phase A1000. Finally, the customer need-analysis system performs the tallying/output processing phase A3000, to perform statistical processing on the data that has been quantified in the customer need-quantification processing phase A2000, and then presents this result to the analyst. Each processing phase is explained below.

The customer-need evaluation keyword setting processing phase A1000 includes: target text input processing (S100) of reading the VOC data 201, which is the subject to be analyzed, from the VOC database unit 200; morphological analysis processing (S200) which analyzes the document data contained in the VOC data 201 that was read; and evaluative word definition processing (S300) which sets the evaluative words for evaluating the VOC data 201 and their levels of importance. Note that the target text input processing (S100) and the morphological analysis processing (S200) are performed by the text mining processing unit 100. The evaluative word definition processing (S300) is performed by the evaluative word definition unit 110.

In Step S100, the morphological analysis unit 101 reads the VOC data 201 from the VOC database unit 200. Specifically, the morphological analysis unit 101 receives a designation indicating which VOC data 201 is to be analyzed, which is inputted via the input device 20 by the analyst, and reads the VOC data 201 of the designated subject from the VOC database unit 200. Note that in the following explanations, questionnaire data concerning the elevator A (which is the data in FIG. 3) is used as an example of the VOC data 201 being evaluated.

In Step S200, the morphological analysis unit 101 performs text parsing processing (word analysis processing) and processing to correlate the parsed words to grammatical parts of speech, on the text-format document data contained in the VOC data 201 that was read in Step S100 (the data in field 304 of FIG. 3). The morphological analysis unit 101 displays the processing results obtained from the morphological analysis processing on the screen of the display device 30, or inputs the results to the evaluative word definition unit 110, or the like. Note that the morphological analysis processing technique performed by the morphological analysis unit 101 may be a technique which already exists (e.g., as published in "Text Mining Application Method", Tetsu ISHII, 2002, Ric Telecom), provided that a word can be parsed appropriately and the grammatical parts of speech can be associated to the word with a certain level of accuracy, and so explanation thereof is omitted here.

Here, the output of the processing results from the morphological analysis processing (S200) performed by the morphological analysis unit 101, is explained with an example in which the processing results are displayed on a screen.

Figure 8:
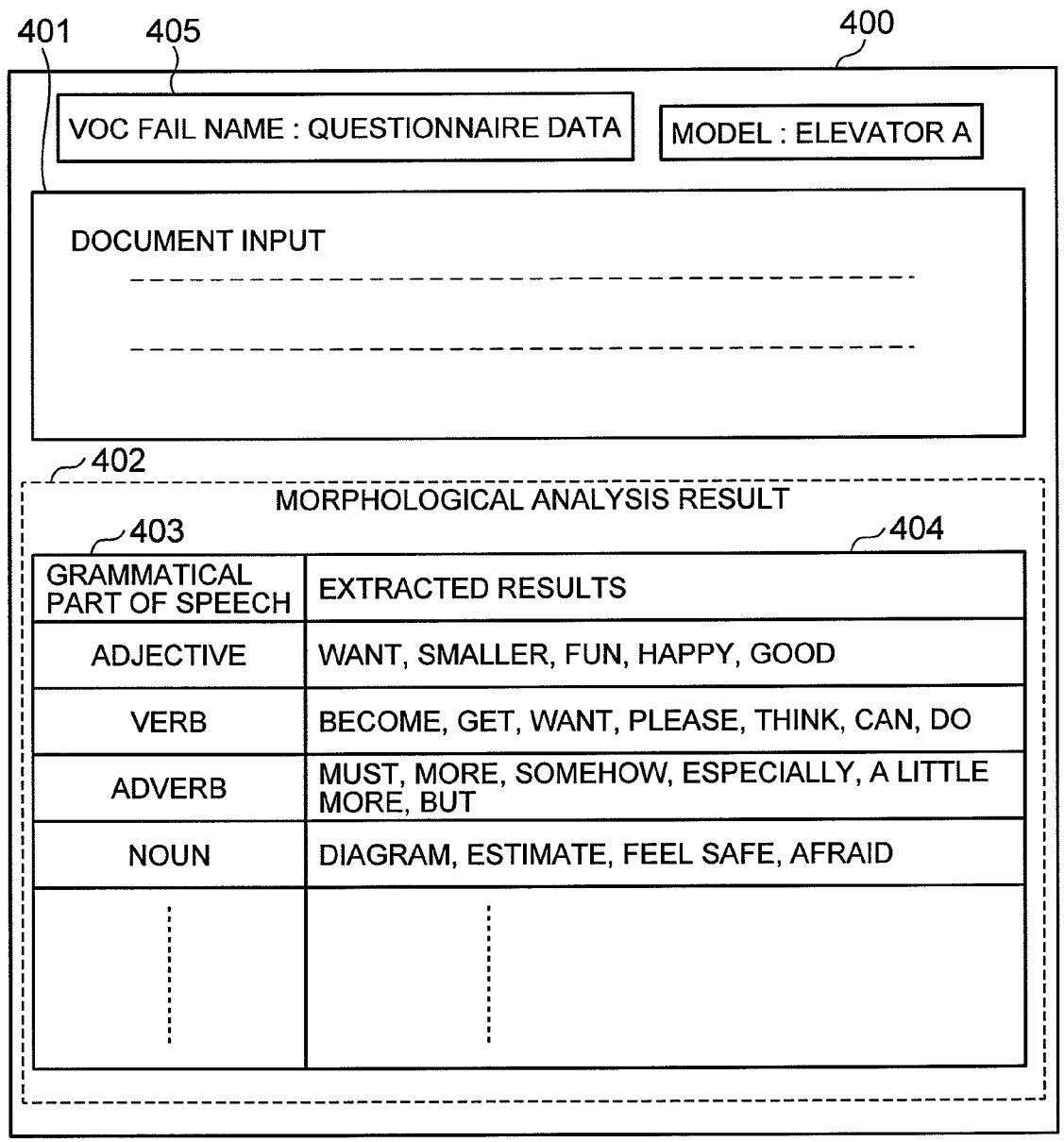
FIG. 8 is a diagram showing an example of a display screen displaying on a display device results of morphological analysis processing according to the embodiment of the present invention.

FIG. 8 is a diagram exemplifying a display screen when results from the morphological analysis processing according to this embodiment are displayed on a display device. As shown in the diagram, the screen 400 includes: a region 405 displaying a filename of the VOC data 201 being processed; a region 401 displaying the text-format document data contained in the VOC data 201 that is being analyzed; and a region 402 displaying the processing results from the morphological analysis processing. The region 402 is provided with a region 403 that displays the grammatical parts of speech of the individual words extracted from the text being processed and a region 404 that displays the individual words that have been extracted. The region 402 displays the extraction results reciting the individual words contained in the text-format text that is being analyzed and shown in region 401, grouping the individual words together by grammatical parts of speech.

Note that in this embodiment, the morphological analysis unit 101 uses the data in the technical term dictionary database unit 210 to perform the morphological analysis processing. This is done for the following reasons. Namely, for general words contained in the VOC data that is being analyzed, the grammatical parts of speech can be identified by using a dictionary (not shown) that is provided for the text mining processing unit 100. However, there are cases where there are technical terms that are used for specific products, and where even general words are used with different meanings depending on the product. Because of this, it is possible that cases will occur in which the dictionary for the text mining processing unit 100 cannot correlate the grammatical parts of speech accurately. Therefore, the words that are picked up in the morphological analysis results, which is the word list, are displayed on the screen 400, and the grammatical parts of speech are modified and correlated by the analyst. The morphological analysis processing unit 101 stores these results in the technical term dictionary database unit 210, which is the user's dictionary.

The explanation continues now referring again to FIG. 6. In Step S300, the evaluative word definition unit 110 obtains, from the morphological analysis unit 101, the "word list data categorized by grammatical parts of speech (e.g., the data displayed in region 402 of FIG. 8)" which are the results of the morphological analysis. Note that the evaluative word definition unit 110 then obtains the name (filename) of the VOC data from which the word list has been extracted, along with the data showing the names of the products being evaluated in association with the "word list data categorized by grammatical parts of speech". Then, the evaluative word definition unit 110 has the analyst extract the evaluative words (keywords) to be used in the customer-need evaluation, from the "word list by grammatical parts of speech", and also has the analyst set the level of importance for each customer need-evaluative word that has been extracted.

Here, before explaining the customer-need quantification processing phase A2000, a detailed explanation is given regarding the processing in Step S300 by referring to FIG. 7.

First, the evaluative word definition unit 110 creates a list of the extracted evaluative words (S3001). Specifically, the evaluative word definition unit 110 receives the "Word list by grammatical parts of speech" from the morphological analysis unit 101. The evaluative word definition unit 110 creates a list of words from the "Word list by grammatical parts of speech", while removing redundant words (individual words) appearing multiple times.

Next, the evaluative word definition unit 110 sorts the data that has been included in the list in Step S3001 according to their grammatical parts of speech (S3002). This is done for the following reasons. Namely, it is thought in general that words (individual words) which are the subject of customer needs with a high level of importance will often be particular grammatical parts of speech such as adjectives, adverbs, verbs, nouns, etc. In light of this, according to this embodiment, in order to prevent the analyzer (user) from overlooking an evaluative word, the list of words created in Step S3001 are sorted according to their grammatical parts of speech.

Note that when the evaluative word definition unit 110 is sorting the grammatical parts of speech, once it has extracted the individual words within a certain grammatical part of speech (e.g., adjective, adverb, verb, noun and other grammatical parts of speech), these may be presented to the analyst. That is, the evaluative word definition unit 110 displays the word list, after removing the words which do belong to those grammatical parts of speech that are not for customer-need evaluations of high importance. This reduces the amount of work for the analyst in performing settings. Here, the predetermined grammatical parts of speech may be set in advance in the evaluative word definition unit 110, or may be set by the analyst.

The evaluative word definition unit 110 displays an evaluative word setting screen 500, such as exemplified in FIG. 9, on the display device 30. The analyst extracts (selects) the evaluative word (individual word) to be used in evaluating the level of importance of the customer needs, from among words displayed in a list. The evaluative word definition unit 110 receives the evaluative word that has been extracted by the analyst (S3003).

FIG. 9 is a diagram exemplifying the evaluative word setting screen in the customer need-analysis system according to this embodiment. As shown in the diagram, the evaluative word setting screen 500 is provided with a region 501 displaying a check box for receiving the extraction (selection) of the evaluative word, and regions 502, 503 each for respectively displaying the list of words and their grammatical parts of speech. In the evaluative word setting screen 500, the list of words are also sorted and displayed according to the predetermined grammatical parts of speech. The analyst manipulates the input device 20 such as a mouse, checks the check box on the screen, to thereby extract (select) the evaluative word to be used for the evaluation of the level of importance of the customer need from among the words displayed in the list. The evaluative word definition unit 110 receives the evaluative word thus extracted.

Furthermore, the evaluative word setting screen 500 also displays the name (filename) of the VOC data 201 that is the source from which the evaluative words are extracted, along with the subject being evaluated (a product name in this case). This is because a consideration is given to a case where the direction of analysis of evaluation needs may be different, depending on the type of the VOC data 201 and a subject of the evaluation. Note that in the example shown in the diagram, a check box is displayed so as to be used as the user interface for receiving the selection of evaluative words from the analyst, but this is merely an example.

By displaying the evaluative word setting screen 500 as described above, it is possible to allow the analyst to select words that are able to specify the customer need desired by the analyst. For example, opinions that state dissatisfaction and needs or desires with respect to existing products should be actively reflected in functions and specifications of a new product which is being developed. A word expressing opinions of this kind, "want", can be set as the evaluative word for the VOC data 201. When a customer uses an existing product and feels satisfied, a word specifying positive needs, such as "happy", can be set as the evaluative word for the VOC data 201. Customer inquiries, questions, and doubts may express not only explicit dissatisfactions but also latent dissatisfactions. A word that specifies these types of opinions may be used as well.

Returning to the explanation of FIG. 7, the evaluative word definition unit 110 creates the evaluative word table 221 that is to be registered in the evaluative word database unit 220 (see FIG. 5), and stores the evaluative word table 221 in the evaluative word database unit 220 (S3004). Specifically, the evaluative word definition unit 110 creates an evaluative word table having entries 2211 to 2214 for registering the database name (VOC data 201 filename) from which the evaluative words selected in Step S3003 are selected; the model name of the subject being evaluated; the evaluative word selected in Step S3003; and the level of importance thereof.

Specifically, the evaluative word definition unit 110 registers the evaluative word that has been selected in Step S3003 (the evaluative word set by the analyst) into the entry 2213; and registers in the entry 2212 the model name of the subject of evaluation for the evaluative word that was registered in the entry 2213; and registers in the entry 2211 the filename of the VOC data 201 from which the evaluative word registered in the entry 2213 has been selected. The reason why the model name of the subject of evaluation is registered into the evaluative word table 221 is because the direction and degree of the evaluative word may vary depending on the product being evaluated. Note that in this processing step, the level of importance has not been set yet. Therefore, "NULL" (or a blank space) is registered in the entry 2214 for registering the level of importance.

Next, in order to give a quantitative definition to the level of importance of the evaluative word, the evaluative word definition unit 110 reads the evaluative words from the evaluative word table as a key, using the product arbitrarily designated by the analyst. This operation prevents multiple levels of importance from being defined for the same product in the evaluative word database unit 220.

The evaluative word definition unit 110 displays an evaluative word setting screen 600, which is for setting the level of importance for a specific evaluative word, on the display device 30, and receives the input of the level of importance for the selected word from the analyst (S3006). Here, FIG. 10 shows an example of the evaluation screen 600 which receives the input of the level of importance for selected words.

FIG. 10 is a diagram showing an example of a screen which is used for setting evaluative words in the customer need-analysis system according to the embodiment of the present invention.

As shown in the diagram, the evaluative word setting screen 600 is provided with a region 601 which displays the evaluative words that were read in Step S3005, and a region 602 which is used for inputting levels of importance for the evaluative words displayed in the region 601. The analyst inputs the level of importance for each evaluative word via the input device 20. The evaluative word definition unit 110 receives the levels of importance inputted by the analyst.

The evaluative word definition unit 110 stores the level of importance received from the analyst, into the entry 2214 that corresponds to the evaluative word table 221 (FIG. 5) in the evaluative word database (S3007).

In this way, by performing the customer-need evaluation keyword setting processing phase A1000, the evaluative words of the VOC data 201 and their levels of importance are stored into the evaluative word database 220 for each product being evaluated. Note that the evaluative word table 221 can even be used when evaluating the VOC data of a product that is different from the VOC data of the product in the evaluative word table 221. For example, in a case where the elevator A is the product that is the subject product in an evaluation target table created, it is thought that an evaluative word table 221 for "elevator A" can be used to evaluate the VOC data of elevator B having similar specifications. Therefore, according to this embodiment, it is not necessary to define the evaluative keywords and their levels of importance for each customer need each time the VOC data 201 is evaluated. Furthermore, it is possible to expand the evaluative words and their levels of importance, using the data stored in the existing evaluative word table 221 as a basis. For example, the evaluative word table 221 was created by using the VOC data 201a in which the results from questionnaires about the elevator A are collected, but in the future when the subject of evaluation is the VOC data 201 in which the results from questionnaires about elevator B are collected, the evaluative word table 221 for the elevator A is expanded upon as necessary and used. Therefore, once the evaluative word table 221 is made, in a case of performing the analysis next, the amount of time for analysis can be reduced.

Returning to FIG. 6, explanation is now given regarding the customer need quantification processing phase A2000.

Specifically, the customer need quantification processing phase A2000 includes: evaluation target text input processing (S400), in which the VOC data 201 to be evaluated is read from the VOC database unit 200; text mining processing (S500), in which the VOC data 201 that was read is categorized by each customer need; and VOC score tallying processing (S600), in which the evaluative word database 220 is referenced, the evaluative words contained in the VOC data being evaluated are extracted, and a score for the VOC data being evaluated is calculated. Note that the evaluation target text input processing (S400) and the text mining processing (S500) are both performed in the text mining processing unit 100. The VOC score tallying processing is performed in the VOC score tally processing unit 120.

In Step S400, the morphological analysis unit 101 of the text mining processing unit 100 follows the same sequence in Step S100 described above, to read the VOC data 201 from the VOC database unit 200. Note that in the following explanations questionnaire data concerning the elevator A is used as an example of the VOC data 201 that is being evaluated.

There is a case where the VOC data 201 that is read in this step and is the subject of evaluation corresponds to the VOC data 201 that was read in Step S100 and is the subject of analysis. In this case, the aforementioned processing results obtained in Step S200 may be used (if the processing results in Step S200 are used, it is also possible to omit the processing of Step S400 and Step S510 to be explained below).

In Step S500, morphological analysis processing (S510) is performed by the morphological analysis unit 101, syntactic analysis processing (S520) is performed by the syntactic analysis unit 102, and clustering processing (S530) is performed by the clustering unit 103.

Specifically, in Step S510, the morphological analysis processing unit 101 follows the same processing as described above in Step S200 to perform text separating processing (individual word parsing processing), and the processing of correlating the parsed individual words to grammatical parts of speech, on the text-format document data contained in the VOC data 201 that was read in Step S400 (S520). Furthermore, clustering processing is performed by the clustering unit 103 to categorize the VOC data into groups of text having similar content.

Note that when the text mining processing unit 100 performs the text mining processing on the VOC data 201 being evaluated, the text mining processing unit 100 uses the technical term dictionary database unit 210 defined above, in addition to the dictionary data (not shown) provided to the text mining processing unit 100, to perform searches for product-specific expressions and words, and categorize the subject VOC data 201 according to categories (appearance, comfort, etc.) of customer needs. Note that the customer need categories are determined by the analyst and inputted into the text mining processing unit 100 in advance.

The clustering unit 103 creates a VOC table 2300 having the VOC data 201 categorized by each category (appearance, comfort, etc.) of customer need, and stores the created VOC table 2300 (see FIG. 4) into the VOC table storage unit 230. Furthermore, the clustering unit 103 displays a screen 700 (FIG. 11), in which the VOC data are categorized into customer need categories, on the display device 30.

FIG. 11 is an example screen with the VOC data 201 categorized by customer needs, which is displayed by the customer need-analysis system of this embodiment. As shown in the diagram, in the screen 700, each category 710 of customer need is correlated to a "VOC-ID", and the "Responses (text-format text)" from the VOC data 201 specified by each "VOC-ID" are displayed.

Returning to FIG. 6, explanation is now given regarding the VOC score tallying processing (S600). The VOC score tallying processing (S600) includes evaluative word extraction processing (S610) performed by the evaluative word extraction unit 121, and score calculation processing (S620) performed by the score calculation unit 122.

In Step S610, the evaluative word extraction unit 121 reads the VOC table 2300 (see FIG. 4) that is stored in the VOC table storage unit 230. The evaluative word extraction unit 121 references the evaluative word table 221 for the product being evaluated that is stored in the evaluative word database unit 220, and extracts the evaluative words from the text-format data (the data showing the "Responses" that is stored in the entry 232) from the VOC table 2300 that was read.

In Step S620, the score calculation unit 122 performs processing to calculate the level of importance of the VOC data 201 contained in the VOC table 2300. Specifically, for each of the "Responses" in the VOC data 201 indicated by the "VOC-ID" stored in the VOC table 2300, the score calculation unit 122 performs processing to tally the values of the levels of importance of the evaluative words extracted by the evaluative word extraction unit 121. This processing calculates the total sum of the levels of importance for each piece of VOC data 201 being evaluated (the total sum of importance of each response (each customer opinion) indicated by the VOC-ID is obtained). The score calculation unit 122 returns the tallied levels of importance to the VOC table storage unit 230 as a score. In other words, the score calculation unit 122 calculates a score for each of the "Responses" indicated by the "VOC-ID" registered in the entry 402 in the VOC table 2300 (see FIG. 4), and registers the calculated score into the entry 233 corresponding to that "VOC-ID".

Here, FIG. 12 shows an example of the scores stored in the VOC table 2300. FIG. 12 is a diagram showing an example of the VOC table which is used in the customer need-analysis system according to this embodiment to analyze the customer needs. Note that in FIG. 12 the scores of the levels of importance are registered in the VOC table 2300 shown in FIG. 4.

As shown in the diagram, the scores for the levels of importance calculated by the score calculation unit 122 are registered in the entry 233. Specifically, in the VOC table 2300, the evaluative words such as "so", "good", "more" and the like appear in the "Responses" shown in the entry 232, corresponding to the entry 231 with "VOC-ID" of "00001". When the levels of importance in the evaluative word table 221 of FIG. 5 are used to tally up, the level of importance for the evaluative word "good" is "1". When the other evaluative words and their levels of importance (the levels of importance of the other evaluative words are not shown in the diagram) are tallied in a similar manner, "VOC-ID" of "00001" obtains a score of "6" for the "Response". Next, the "Response" of "VOC-ID" of "00002" contains the evaluative word "not". The level of importance associated with "not" is "1", and "VOC-ID" of "00002" obtains a score of "1" for the "Response". This series of processes are performed on all of the "Responses" that are stored in the VOC table 2300.

Next, an explanation is given regarding the tallying/output processing phase A3000. The tallying/output processing phase A3000 includes: output-condition input processing (S700) which is performed in order to obtain the data that is to be tallied/outputted; tallying processing (S800) in which the inputted subject data is used to perform various kinds of statistical processing on the data in the VOC table; and output processing (S900) in which the tallied results are displayed on the display device 30. Note that the output-condition input processing (S700) is performed in the data input unit 131. The tallying processing (S800) is performed in the tallying unit 132. The output processing (S900) is performed in the output processing unit 133.

Specifically, in Step S700 the data input unit 131 reads the VOC table 2300 (FIG. 12) from the VOC table storage unit 230. The "VOC-ID" in the VOC table 230 that was read is used as a key to obtain the attribute information of that VOC-ID from the VOC database unit 200. The data input unit 131 outputs the VOC table 2300 that was read, along with the attribute information that was received, to the tallying unit 132.

In Step S800, the tallying unit 132 uses the VOC table 2300 that was read from the data input unit 131, and the attribute information that was received, to calculate the following from the total sum of levels of importance of the evaluative words in a single VOC data 201 record: the "number of customer opinions received for each category of customer need"; "score sum"; "score average"; and "score distribution". Furthermore, the tallying unit 132 creates a tally table which is made of the calculation results turned into files. Here, FIG. 13 shows an example of the tally table.

FIG. 13 is a diagram schematically showing a data structure of a tallying table in the evaluative word database unit 220 according to this embodiment of the present invention.

As shown in the diagram, the tallying table 800 is made for each VOC data 201 (i.e., made for each file). The tallying table 800 is provided with entries 801 to 805. Entry 801 has each "customer need (need category)". Entry 802 has "quantity of responses" in the VOC data 201, classified into each "customer need (need category)" listed in entry 801. Entry 803 has "score sum" showing the sum of the levels of importance of the records for each "customer need (need category)" listed in entry 801. Entry 804 has "score average" showing the average of the levels of importance of the records for each "customer need (need category)" listed in entry 801. Entry 805 has "score distribution" for the levels of importance of the records of each "customer need (need category)" listed in entry 801.

Furthermore, the tallying unit 132 creates a tallying table 900 with the attribute information added. An example of the tallying table 900 is shown in FIG. 14.

FIG. 14 is a diagram schematically showing a data structure of the tallying table in the evaluative word database unit 220 according to this embodiment.

As shown in the diagram, the tally table 900 is made for each VOC data 201. More specifically, the tallying table 900 has entries 901 to 905. Entry 901 has "VOC-ID". Entries 902 and 903 have attribute information (here, "region" and "type") of a particular record indicated by the "VOC-ID" in each entry 901. Entry 904 has "customer needs" in which the records indicated by the "VOC-ID" listed in entry 901 are categorized. Entry 905 has the levels of importance for each record indicated by the "VOC-ID" listed in the entry 901.

Returning to FIG. 6, explanation is now given regarding the output processing in Step S900. Specifically, in Step S900 the output processing unit 133 displays the output-condition setting screen (e.g., FIGS. 15 and 17) and receives the output condition that is inputted by an analyst. There are no particular restrictions as to the specific content of the output condition. However, for example, the output processing unit 133 receives input of information including: (a) selection of the subject to be evaluated as the score based on each customer opinion or the score based on categorizing the VOC data 201 according to each customer need; (b) a selection of an output method (namely, selection of a type of graph); and (c) a selection of the axes of the graph.

The output processing unit 133 uses the received output conditions and the tallying tables 800 and 900 to analyze the relationship between the attribute information and the scores for the individual records in the VOC data 201. The output processing unit 133 not only identifies the customer opinions (Responses) in the records with high scores, but also identifies the unique factors in customer needs which have high (or low) scores. In other words, a chief purpose of the output processing unit 133 is to visualize the scores (levels of importance) of the customer needs. The output processing unit 133 uses the data that was tallied up by the tallying unit 132, to express the scores (levels of importance) of the customer needs as various graphs and the like. Here, two examples are given to explain the output processing that the output processing unit 133 presents to the analyst.

The first example illustrates a case where the output processing unit 133 displays the scores of the levels of importance of the customer needs in a 3D bar chart.

Figure 15:
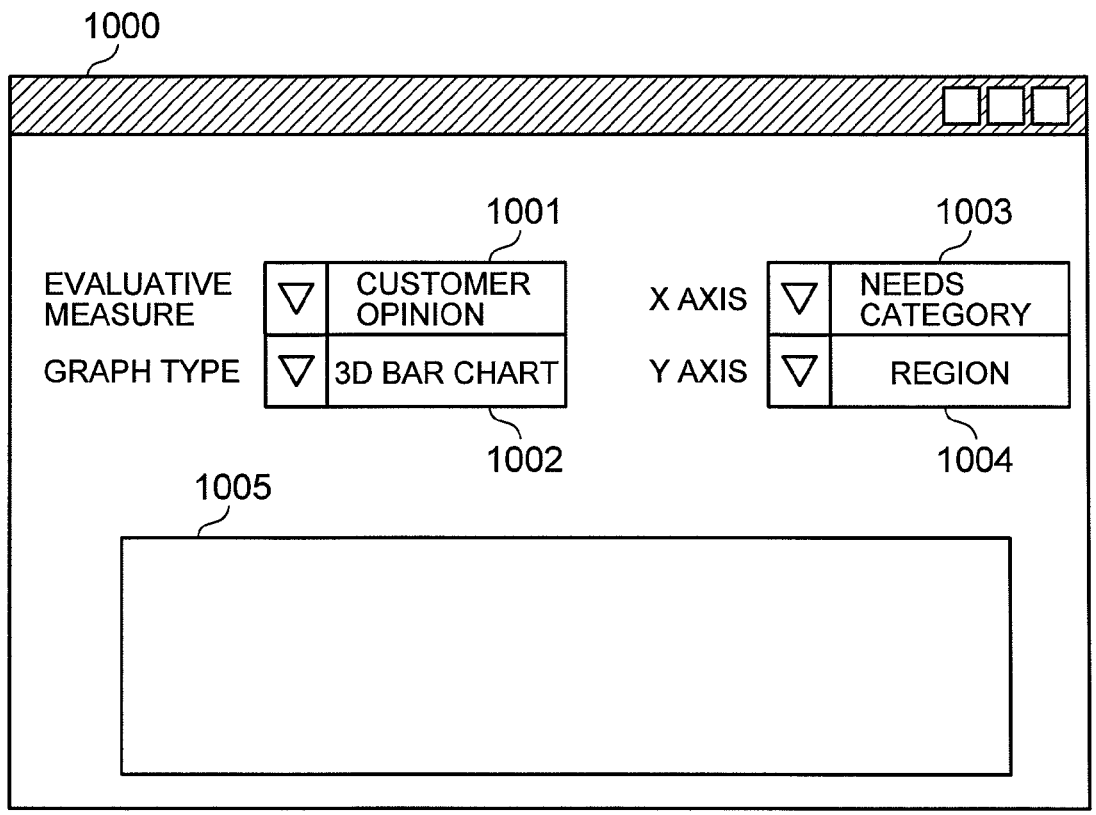
FIG. 15 is a diagram showing an example of a screen for designating outputs of customer need scores in the customer need-analysis system according to the embodiment of the present invention.

Specifically, the output processing unit 133 displays an output designation screen 1000 as shown in FIG. 15 on the display device 30. FIG. 15 is a diagram showing an example of the output designation screen, which is displayed by the customer need-analysis system according to the embodiment of the present invention.

As shown in the diagram, the output designation screen 1000 includes: a region 1001 for setting the unit being evaluated; a region 1002 for setting the graph type to display; a region 1003 for setting the category represented in the X-axis of the graph; a region 1004 for setting the category represented in the Y-axis of the graph; and a region 1005 for displaying the resulting graph created according to the conditions designated in the regions 1001 to 1004.

The output processing unit 133 displays the output designation screen 1000, and also uses the data of the tallying table 800 and the tallying table 900, created in the tallying unit 132, to receive input of the settings for score evaluation measures, graph type, and data to be represented in the graph's axes. More specifically, the analyst browses the output designation screen 1000 and sets the output conditions in the regions 1001 to 1004 in the screen 1000. Then, the output processing unit 133 receives the input of the output conditions from the analyst, and creates a graph according to those output conditions to display in the region 1005.

Here, suppose that the output processing unit 133 received the conditions shown in the diagram. In other words, the output conditions are as follows: the evaluation measure is the "customer opinion"; the graph type is "3D bar chart"; the X-axis is "need category"; and the Y-axis is "region". In such a case, the output processing unit 133 uses the data in the tallying table 800 and the tallying table 900 to display a 3D bar chart in the region 1005 as shown in FIG. 16.

Figure 16:
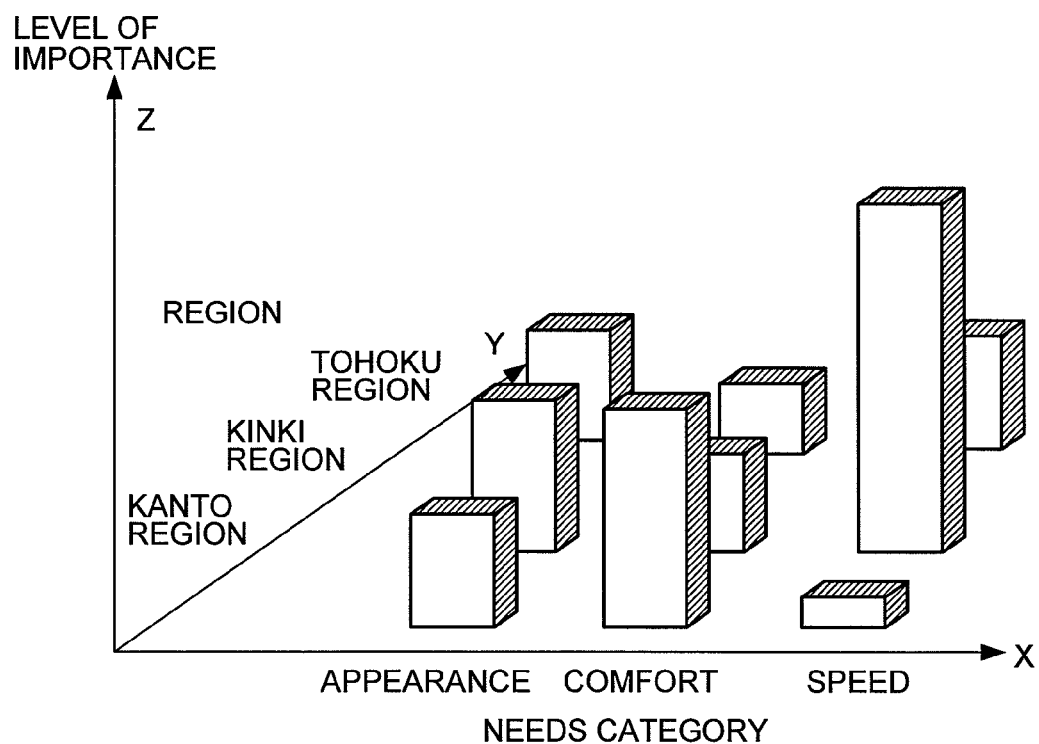
FIG. 16 is an example showing the levels of importance of customer needs as a 3D bar chart in the customer need-analysis system according to the embodiment of the present invention.

FIG. 16 is an example showing the levels of importance of the customer needs in a 3D bar chart, according to the customer need-analysis system of this embodiment. As shown in the diagram, in the 3D bar chart, the units being evaluated are the customer opinions, and the X-axis represents the "need category", the Y-axis represents the "region", and the Z-axis represents the "level-of-importance score". From the results, it is possible to determine which segment of customers is sensitive to which customer needs. In the example shown in the diagram, the region is set as the customer attribute for the given customer needs. The analyst browses the 3D bar chart to comprehend, for example, that "speed" is important in the Kinki region. Thus, the analyst can define a product development strategy to develop products for the Kinki region that pursue "speed". Alternatively, the analyst can decide to adopt a strategy enhancing their advertising promotions that emphasize "speed" to customers in the Kinki region. By using those outputs, the analyst can quantitatively grasp those customer needs which are important in product development, from the voluminous customer opinions. Furthermore, those results can be quantitatively and logically shown for design and sales and the like.

Next, a second example is explained. The second example is a case in which the output processing unit 133 presents the levels of importance of the customer needs as a radar chart.

Figure 17:
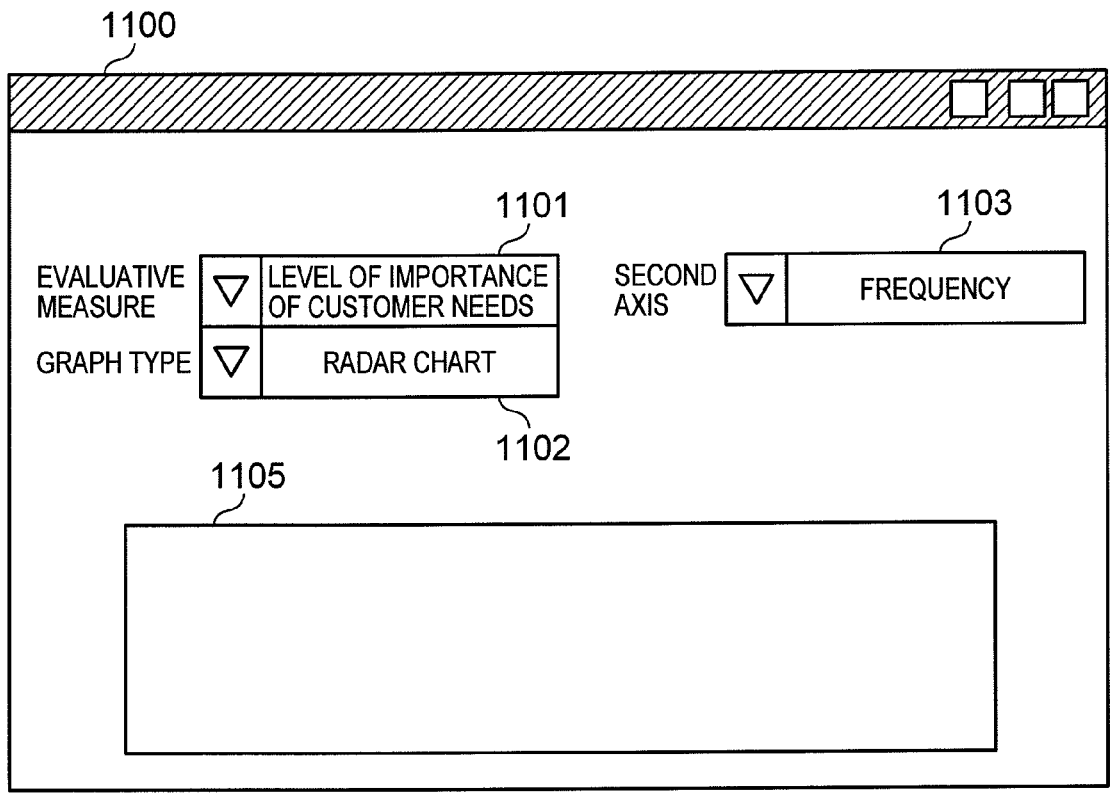
FIG. 17 is a diagram showing another example of a screen for designating the outputs of the customer need scores, which is displayed by the customer need-analysis system according to the embodiment of the present invention.

Specifically, the output processing unit 133 displays an output designation screen 1100 as shown in FIG. 17 on the display device 30. FIG. 17 is a diagram showing an example of the output designation screen, which is displayed by the customer need—analysis system according to the embodiment of the present invention.

As shown in the diagram, the output designation screen 1100 has a region 1101 for setting the units to be evaluated, a region 1102 for setting the graph type to display, and a region 1103 for selecting the second axis of the graph as the analyst desires. The region 1103 has the evaluative category that will be used to compare the unit to be evaluated (e.g., the level of importance of the customer need), which is set in region 1101. For example, the region 1103 may have the appearance-frequency (frequency) of particular words contained in the VOC data being evaluated. Note that the frequency of particular words can be calculated using quantitative data pertaining to each customer need.

The output processing unit 133 displays the output designation screen 1100, and also uses the data of the tallying table 800 and the tallying table 900 created in the tallying unit 132, to receive input of the settings for "unit to be evaluated", "graph type", and "second axes". More specifically, the analyst browses the output designation screen 1100 and sets the output conditions in the regions 1101 to 1103 in the screen 1100. Then, the output processing unit 133 receives the input of the output conditions from the analyst, and creates a graph according to those output conditions to display in the region 1105.

Suppose that the output processing unit 133 received the conditions shown in FIG. 17. In other words, the output conditions are as follows: the unit to be evaluated is the "level of importance of particular customer needs"; the graph type is "radar chart"; and the second axis is "frequency". In such a case, the output processing unit 133 uses the data in the tallying table 800 and the tallying table 900 to display a 3D bar chart in the region 1105 as shown in FIG. 18.

Figure 18:
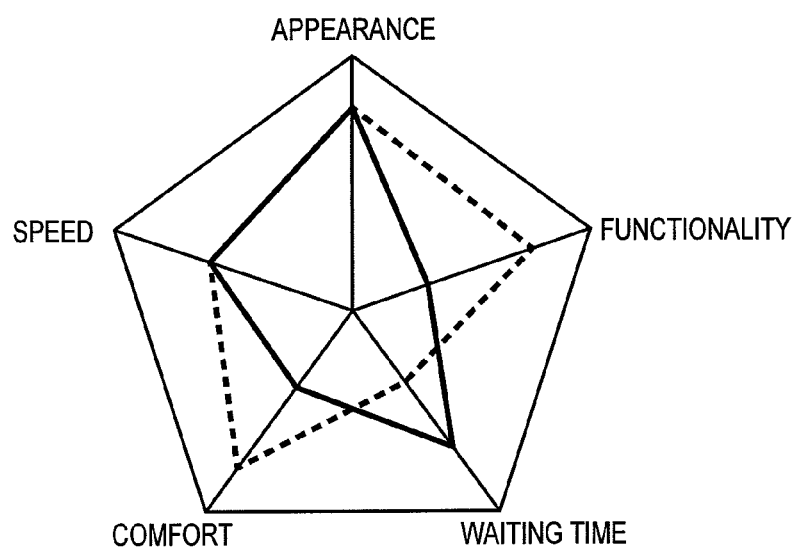
FIG. 18 is an example in which the levels of importance of the customer needs are shown as a radar chart, in the customer need-analysis system according to this embodiment.

FIG. 18 is an example a radar chart showing the levels of importance of the customer needs according to the customer need-analysis system of this embodiment. As shown in the radar chart, customer opinions concerning waiting time are infrequent (meaning that interest does not exist or has not surfaced) but the scores are high, and a gap occurs. Therefore, it can be interpreted that although there are few requirements with respect to waiting time, there is a high proportion of some sort of dissatisfaction or unmet expectation with respect to the current conditions.

In this way, according to this embodiment, voluminously accumulated customer opinions inputted in natural language can be evaluated quantitatively. In other words, according to this embodiment, an objective evaluation is possible without relying on an analyst's sensibilities or experience. Therefore, in the initial stage of product lifecycle in which product planning and development are carried out, it is possible to engage in product development that properly reflects the customers' opinions.

Note that the present invention is not limited to this embodiment described above, but can be modified in various ways within the scope of the gist of the present invention. For example, the evaluative word definition unit 110 stores in advance a predetermined number of important words deemed necessary for evaluation of the customer needs. Then, if the important words are present in the words obtained from the morphological analysis unit 101, the evaluative word definition unit 110 may display those important words on the keyword setting screen in such a way that those important words can be distinguished from other words (e.g., by emphasizing the display of the important words, or displaying those words in brighter colors such as red). Alternatively, the evaluative word definition unit 110 may extract only the words that belong to a particular grammatical part of speech from the words obtained in the morphological analysis unit 101, and when important words exist in the extracted words, those important words can be displayed on the keyword setting screen in such a way that those important words can be distinguished from other words. This configuration can prevent the important words from being passed over.

Furthermore, in this embodiment the evaluative words and their levels of importance are used to calculate the score values of the various customer needs, but it is also possible to add values from evaluations done in other categories to the score value. For example, a value that is determined based on the length of text written in a questionnaire response box may be added to the score. This configuration is adopted because it is thought that, when a long text is written in the questionnaire box, the responder's thoughts, desires, requests, and dissatisfactions are written thoroughly. Even if the same customer needs are written in this type of customer opinion and in a customer opinion that is written with just a few sparse words, the level of importance may be different between the two. Therefore, if the score is calculated according to the length of the text written in the questionnaire response box, the customer needs can be calculated with higher precision.

Furthermore, this embodiment provides a single information processor 10 including inside all functions (the VOC data text mining processing unit 100, the evaluative word definition unit 110, the VOC score tally processing unit 120, the tally processing unit 130, the VOC database unit 200, the technical term dictionary database unit 210, the evaluative word database unit 220, and the VOC table storage unit 230). However, this configuration is merely an illustrative example. For example, the system may be configured with each unit's functions dispersed across multiple devices.

What is claimed is:

1. An information processor, which performs processing of analyzing customer needs by using customer opinion information, comprising:
a storage unit which stores a database in which plural customer opinion information is registered, the customer opinion information including text-format document data of opinions from customers expressed in natural language concerning one of a product and a service to be analyzed;
a morphological analysis unit which parses into individual words the document data contained in the customer opinion information registered in the database, correlates each parsed individual word to a grammatical part of speech, and outputs data correlating the individual words to their grammatical parts of speech;
a syntactic analysis unit which uses the data outputted from the morphological analysis unit to analyze content of the document according to relationships among the individual words;
a clustering unit which uses the processing results from the syntactic analysis unit to categorize the plural customer opinion information according to predetermined customer needs, and outputs the customer opinion information categorized according to the customer needs;
an evaluative word definition unit which receives, from a user, a setting of a keyword for evaluating a customer need, and further receives an input of an evaluation value that is correlated to the received keyword to show an evaluative level of the keyword; and
an evaluation unit which obtains the customer opinion information categorized according to the customer needs, extracts the keyword for each item of the customer opinion information, from the document data contained in the customer opinion information, and calculates a score showing a level of importance of the customer need in which the evaluation values correlated to the extracted keyword are tallied,
wherein the evaluative word definition unit obtains from the morphological analysis unit the data correlating each individual word to a grammatical part of speech, sorts the obtained data according to each grammatical part of speech, presents to the user the individual words sorted according to each grammatical part of speech, and receives settings of keywords from among the individual words that are presented, according to a request from the user.

2. An information processor according to claim 1, wherein a display device is connected to the information processor, and the evaluative word definition unit is configured to:
extract an individual word belonging to a particular grammatical part of speech from among data correlating the obtained individual word to the grammatical part of speech, and sort the extracted individual word according to the grammatical part of speech;
display a keyword setting screen showing sorted individual words and grammatical part of speech in a list format on the display device, receive a selection of the individual words to be used as keywords from among the individual words shown on the keyword setting screen, and further receive input of the evaluation values correlated to the individual words selected as the keywords.

3. An information processor according to claim 2, wherein:
the evaluative word definition unit keeps a predetermined number of important individual words that are thought in advance to be necessary for the evaluation of the customer needs; and
in a case where the extracted individual words include at least one important word, the evaluative word definition unit displays the important individual word on the keyword setting screen in such a manner as to be distinguishable from the individual words that are not important words.

4. An information processor according to claim 1, further comprising an output unit which obtains from the evaluation unit evaluative data in which the customer opinion information, categorized according to the customer needs, is correlated to scores showing the levels of importance of the customer needs for each item of customer opinion information, performs predetermined statistical processing on the evaluative data, and presents the result to the user.

5. An information processor according to claim 4, wherein:
the document data contains attribute information about one of a product and a service; and
the output unit uses the attribute information to categorize the customer opinion information according to certain attributes, and presents the results to the user.

6. An information processor according to claim 1, further comprising a technical term dictionary database storing words that are technical terms relating to one of the product and the service, which have different meanings from meanings generally used, and grammatical part-of-speech information of those words,
wherein the syntactic analysis unit references the technical term dictionary database to analyze document content.

7. A customer need-analysis method performed by an information processor having a storage unit storing a database in which plural customer opinion information is stored,
the customer opinion information including text-format document data of opinions from customers expressed in natural language concerning one of a product and a service to be analyzed, wherein:
the information processor performs:
the step of reading the database from the storage unit, parsing into individual words the document data contained in the customer opinion information registered in the database, correlating the parsed individual words to grammatical parts of speech, and outputting data correlating the individual words to their grammatical parts of speech;
the step of using the data correlating each individual word to its grammatical part of speech to analyze document content according to relationships among the individual words;
the step of using the analyzed results to categorize the plural customer opinion information according to predetermined customer needs, and outputting the customer opinion information categorized according to the customer needs;
an evaluative word definition step of receiving, from a user, a setting of a keyword for evaluating a customer need, and further receiving an input of an evaluation value that is correlated to the received keyword to show an evaluative level of the keyword; and
the step of obtaining the customer opinion information categorized according to the customer needs, extracting the keyword for each item of the customer opinion information, from the document data contained in the customer opinion information, and calculating a score showing a level of importance of the customer need in which the evaluation values correlated to the extracted keyword are tallied; and
the evaluative word definition step sorts the data correlating the individual words to their grammatical parts of speech by their grammatical parts of speech, presents the individual words sorted by their grammatical parts of speech to the user, and receives settings of keywords from among the individual words that are presented, according to a request from the user.

8. A computer readable storage medium encoded with a computer program causing an information processor, which is provided with a storage unit storing a database in which plural customer opinion information is stored, to execute processing of analyzing customer needs,
the customer opinion information including text-format document data of opinions from customers expressed in natural language concerning one of a product and a service to be analyzed,
the program causing the information processor to execute:
the step of reading the database from the storage unit, parsing into individual words the document data contained in the customer opinion information registered in the database, correlating the parsed individual words to grammatical parts of speech, and outputting data correlating the individual words to their grammatical parts of speech;
the step of using the data correlating each individual word to its grammatical part of speech to analyze document content according to relationships among the individual words;
the step of using the analyzed results to categorize the plural customer opinion information according to predetermined customer needs, and outputting the customer opinion information categorized according to the customer needs;
an evaluative word definition step of receiving, from a user, a setting of a keyword for evaluating a customer need, and further receiving an input of an evaluation value that is correlated to the received keyword to show an evaluative level of the keyword; and the step of obtaining the customer opinion information categorized according to the customer needs, extracting the keyword for each item of the customer opinion information, from the document data contained in the customer opinion information, and calculating a score showing a level of importance of the customer need in which the evaluation values correlated to the extracted keyword are tallied, wherein the evaluative word definition step sorts the data correlating the individual words to their grammatical parts of speech by their grammatical parts of speech, presents each individual word sorted by its grammatical part of speech to the user, and receives settings of keywords from among the individual words that are presented, according to a request from the user.

* * * * *